Oct. 2, 1928.

H. D. CHURCH 1,685,983

CLUTCH PLATE

Filed March 29, 1926

Inventor
Harold D. Church
By Blackmore, Spencer & Flint,
Attorneys

Patented Oct. 2, 1928.

1,685,983

UNITED STATES PATENT OFFICE.

HAROLD D. CHURCH, OF CLEVELAND, OHIO, ASSIGNOR TO GENERAL MOTORS CORPORATION, OF DETROIT, MICHIGAN, A CORPORATION OF DELAWARE.

CLUTCH PLATE.

Application filed March 29, 1926. Serial No. 98,266.

This invention relates to clutches and, in particular, to clutches of the single driven disc type. It has been designed for use in making the connection between the motor shaft and the propeller shaft of a motor vehicle, but the use of the clutch in other relations is obviously possible and is within the contemplation of the inventor.

In clutches of the above mentioned type, it has been found desirable to effect a gradual clutch engagement, whereby the clutch elements shall not suddenly grip, which gripping action is injurious to the clutch and the driven elements of the vehicle, and also is unpleasant for the passengers. It is for the purpose of over-coming such defects in clutch action that the structure of this invention has been devised.

It is an object of the invention to provide for a gradual clutch application by means which shall be simple in structure and cheap of manufacture.

A further object is to secure a gradual engagement of the clutch elements by the use of distorted discs so that the clutch shall offer a gradually increasing resistance to flattening.

A further object is to make the driven disc in the form of distorted segmental members attached in a circumferential series about a hub member slidable on the end of the driven shaft.

Other objects and advantages inherent in the structure of the invention will be obvious upon a reading of this specification in the light of the drawings associated therewith.

In the drawing:

Figure 1 is a vertical sectional view through a single plate clutch.

Figures 2, 3 and 4 are vertical sections transversely of the driven clutch plate and hub, showing three forms of segmental discs which may be used, the sections being indicated by lines 2—2, 3—3 and 4—4 of Figures 5, 6 and 7, respectively.

Figure 1:
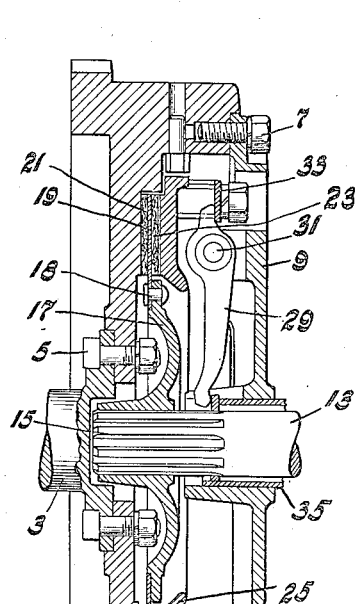

Referring by reference characters to the drawing, numeral 1 represents the fly wheel of an internal combustion motor. This fly wheel is secured to the crank shaft 3 by fastening means 5. Secured to, but spaced from, the fly wheel by fastening means 7 is a plate 9. The fly wheel is provided with a frictional face 11 of annular form, which constitutes the driving member of the clutch. The driven member of the clutch is slidably mounted on propeller shaft 13 by means of the splines 15. This driven member is constituted by a hub 17 attached to the outer periphery of which by bolts or rivets 18, is the annular driven member 19 of the clutch. Upon both faces of the driven member 19 are annular friction members 21 and 23. To secure the driving relationship between the driving and driven clutch members there is employed an annular pressure plate 25. This pressure plate is engaged by coil springs 27 arranged circumferentially about the pressure plate 25, one only of these springs being shown in Figure 1. The springs have the plate 9 for their outer-most abutment, and serve to push the pressure plate toward the fly wheel and therefore effect the driving engagement between the clutch members 11 and 19.

For the purpose of effecting the release of the clutch there may be used a lever 29 pivoted to the plate 9 at 31. At its outer most end the lever engages a bridge member 33 carried by the pressure plate 25. An inward movement of the inner end of lever 29 is produced by a movable sleeve 35. It will be seen that an inward movement of sleeve 35 rotates lever 29 clock-wise and releases the clutch. The operating means for sliding the sleeve 35 may be of any suitable form and are not shown.

The invention to which this application is directed is concerned more particularly with the driven clutch member. This driven clutch member is associated with the hub member 17, as stated above. The clutch member is of annular form and in each of the several modifications is made up of a series of segmental plates arranged circumferentially and is secured to the hub member 17. It will be also observed that in each of the several modifications there is a distorted part or parts in the segmental members constituting the driven clutch ring.

Figure 2:
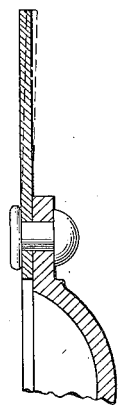
Figure 5:
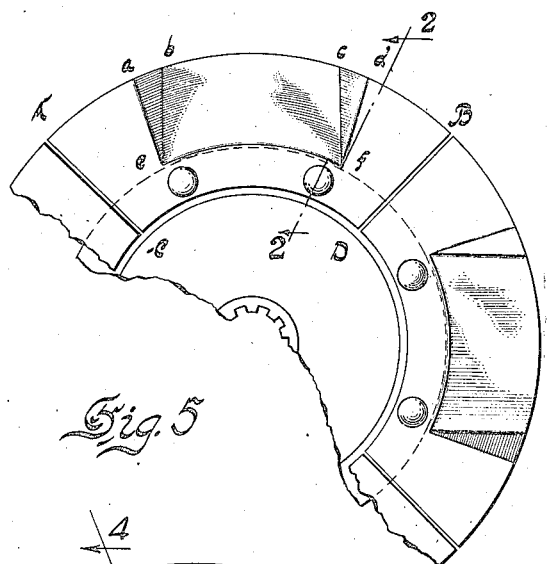
Figure 5 is a view in elevation of the hub and segmental discs constituting the driven member of the clutch.

Figure 5 and Figure 2 represent what we now believe to be the preferred form of distorted clutch segmental member. This plate which may be represented by A, C, D, and B, has pressed from its surface a portion represented by a, e, f, d. The area represented by b, e, f, c, constitutes a plane surface which intersects the surface of the plate proper at about the line e, f, and diverges from said plane, its line of greatest divergence being at b—c. The triangular portions a, b, e, and c, d, f are also, in this preferred form, plane surfaces and unite the plane surface b, e, f, c, with the plane of the plate. It should also be noted that the distortion in alternate plates is in opposite directions, that is to say, in one plate the distortion may be said to be above the plane of the figure, and in the next plate is below the plane of the figure. Thus, in the form of Figure 5 where four segments are shown there will be two distorted parts above the plane of the figure, and two below the plane of the figure.

Figure 3:
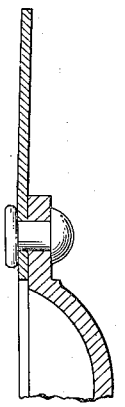
Figure 6:
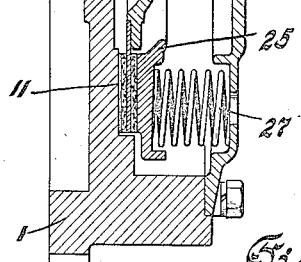
Figure 6 is an elevation of a modified form of segmental disc member.

Figure 6 and Figure 3, in section, show a second form in which this invention may be embodied. In this modification the surface of the plate A, C, D, B is distorted through a portion represented by h, k, l and m. It will be observed that this form is somewhat simpler than the one previously described. Here again the distortions of alternate plates will be in opposite directions, as in the form before described.

Figure 4:
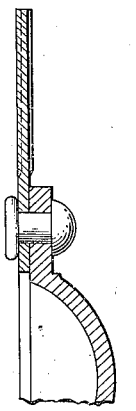
Figure 7:
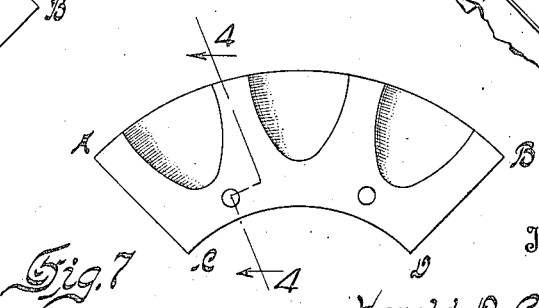
Figure 7 shows still another modification in elevation.

Figure 7 shows a third form of the invention. This form is also illustrated in the sectional view of Figure 4. In this form, instead of providing a single distorted portion from each segment, there are a plurality of distorted parts in each segment, three being the number shown. In this form, as in the others, the distorted portions will be alternately arranged on opposite sides of the plane of the disc.

With the driven clutch member of the form described, the distorted surfaces are first brought into engagement with the driving clutch member and pressure plate. As the pressure of springs 27 increases upon the release of the clutch pedal the distorted surfaces become gradually flattened out. The clutch therefore is brought gradually into engagement instead of abruptly. The action is smooth, securing safety for the motor parts and the driven parts and comfort for the passengers.

I claim:

1. A clutch plate member of segmental shape having an intermediate portion in the form of a plane surface positioned at an angle to the common plane of the end portions and the inner edge.

2. A clutch plate member of segmental shape having an intermediate portion distorted from the plane of the plate, the length of the distorted portion being variable and greatest at the outer portion of the plate.

3. A clutch plate member of segmental shape, having an intermediate distorted portion, the distorted portion being bounded by a part of the outer edge of the plate and by a pair of approximately radial lines.

4. A clutch member of segmental shape having an intermediate distorted portion, the distorted portion constituted by a plane surface at a slight angle to and intersecting the plane surface of the plate adjacent its inner arc, and triangular plane surfaces connecting said distorted surface with each of the end portions of the plate.

5. In a disc clutch, a disc including a series of segmental plates circumferentially arranged, one or more of said plates having end portions lying in a common plane and having an intermediate portion between said coplanar ends distorted from said common plane.

6. In a disc clutch, a disc comprised of a series of segmental plates circumferentially arranged, each of said plates having end portions lying in a common plane and a portion between said end portions distorted from said common plane.

7. A clutch plate member of segmental shape having coplanar end portions and an intermediate portion bent from the common plane of said ends.

8. A clutch member comprising a circumferentially arranged series of segmental plates, each plate having end portions lying in a common plane and an intermediate portion distorted from said common plane.

9. A clutch plate member of segmental shape having end portions lying in a common plane and an intermediate portion distorted from the plane of said end portions throughout a part of its radial dimension.

10. A clutch plate member of segmental shape having end portions lying in a common plane and an intermediate portion in the form of a plane surface positioned at an angle to the common plane of said end portions.

11. A clutch plate as defined in claim 10, there being a triangular section joining the intermediate portion with each end portion.

In testimony whereof I affix my signature.

HAROLD D. CHURCH.